United States Patent [19]

Vollkommer

[11] 3,855,260

[45] Dec. 17, 1974

[54] MELT PREPARATION OF S-METHYL N-(METHYL-CARBAMOYL)OXY)THIOACETIMIDATE

[75] Inventor: Robert J. Vollkommer, Claymont, Del.

[73] Assignee: E. I. du Pont de Nemours and Company, Wilmington, Del.

[22] Filed: Dec. 22, 1972

[21] Appl. No.: 317,803

[52] U.S. Cl............................................ 260/453 R
[51] Int. Cl......................................... C07c 119/16
[58] Field of Search .......... 260/453 R, 566 AC, 691

[56] References Cited
UNITED STATES PATENTS

| | | | |
|---|---|---|---|
| 3,223,733 | 12/1965 | Heiss et al.................... | 260/566 AC |
| 3,328,457 | 6/1967 | Payne, Jr...................... | 260/566 AC |
| 3,560,555 | 2/1971 | Fuchs............................ | 260/453 R |
| 3,576,834 | 4/1971 | Buchanan..................... | 260/453 R |

Primary Examiner—Glennon H. Hollrah

[57] ABSTRACT

S-methyl N-[(methylcarbamoyl)oxy]thioacetimidate is made in high yield by reacting methylisocyanate with S-methyl N-hydroxythioacetimidate in the absence of solvent and under conditions such that for at least a terminal portion of the reaction, the reaction mass is maintained as a continuous liquid phase.

8 Claims, 2 Drawing Figures

MELT PREPARATION OF S-METHYL N-(METHYL-CARBAMOYL)OXY)THIOACETIMIDATE

BACKGROUND OF THE INVENTION

Organic chemical reactions are most frequently carried out by bringing the reactants into contact with one another at a temperature below the melting point of at least one of the reactants. Under such conditions, it is generally necessary in order to obtain a reasonably fast and complete reaction, to conduct the reaction in a liquid solvent system.

S-methyl N-[(methylcarbamoyl)oxy]thioacetimidate has heretofore been prepared only at temperatures substantially below both its melting point (approximately 78°C.) and the melting point of its most convenient precursor, S-methyl N-hydroxythioacetimidate (approximately 93°C.), and has heretofore been prepared only in a liquid solvent system, with only one known exception.

In U.S. Pat. No. 3,506,698, issued Apr. 14, 1970, to Arthur G. Jelinek, there is disclosed a process for making S-methyl N-[(methylcarbamoyl)oxy]thioacetimidate by reacting methyl isocyanate with an aqueous slurry of S-methyl N-hydroxythioacetimidate. At no time during this process is the temperature permitted to rise higher that 55°C. And, in U.S. Pat. No. 3,675,834, issued Apr. 27, 1971, to James B. Buchanan, there is disclosed the same reaction being conducted in a methylene chloride solution. At no time during the course of this reaction is the temperature permitted to rise higher than 32°C.

While a solvent system reaction of methyl isocyanate and S-methyl N-hydroxythioacetimidate is reasonably rapid and complete, there are a number of disadvantages in the use of a solvent system reaction. Such a procedure is complex and the use of a solvent necessitates the use of numerous and expensive processing steps and equipment. The solvent must be stored; it must be introduced and maintained in the system in proper quantity and purity; it must be removed from the system as by distillation and disposed of or returned for further storage. The end product must be crystallized and centrifuged or filtered and then dried. These steps increase the cost and complexity of the process.

The desirablility for running the above-mentioned reaction solventless was recognized and afforded an incentive for the invention which is the subject of copending U.S. patent application Ser. No. 263,760, filed July 19, 1972, by Jose R. Alvarez. In that application, there is disclosed a process for running the above-mentioned reaction in the absence of solvent by reacting gaseous or liquid methyl isocyanate with solid particulate S-methyl N-hydroxythioacetimidate. Alvarez requires that the reaction be run in the absence of a continuous liquid phase while removing the heat of reaction, the rates of isocyanate addition and heat removal being balanced so as to maintain the temperature of the reaction mass below the melting points of both the starting thiohydroxamate and the thiohydroxamate carbamate finished product. While running the reaction in this fashion does eliminate many of the disadvantages of working with a solvent system, it also eliminates several of the advantages of working with a liquid system, for example, ease of assuring complete intermixture of the reactants, ease of maintaining absence of temperature gradients or hot spots in the reaction mass, faster and more complete reaction, and ease of physical handling of reactants and reaction products.

The relatively high temperatures generally required to bring organic materials to a molten state would normally preclude an effective, efficient and complete reaction of such materials producing high quality and high yield of the desired product. Temperatures high enough to melt the reactants will normally produce side reactions and significant amounts of by-products thus decreasing the yield and quality of the desired product. Such temperatures are likely to cause significant decomposition of both the starting materials and the finished products. For example, a temperature of approximately 100°C. is sufficient to completely decompose a sample of purified (recrystallized) S-methyl N-hydroxythioacetimidate within only 30 minutes.

It has now been found that S-methyl N-[(methylcarbamoyl)oxy]thioacetimidate can be produced in a solventless reaction while maintaining the reaction mass as a continuous liquid phase for at least a terminal portion of the reaction, thus eliminating or diminishing the disadvantages discussed above in connection with solvent reactions and solid state reactions, while avoiding significant side reactions, or significant decomposition of the reactants or reaction products. This is accomplished by careful control of operating conditions and results in a fast, complete reaction which produces high quality and high yields of the reaction product.

SUMMARY OF THE INVENTION

Figure 1:
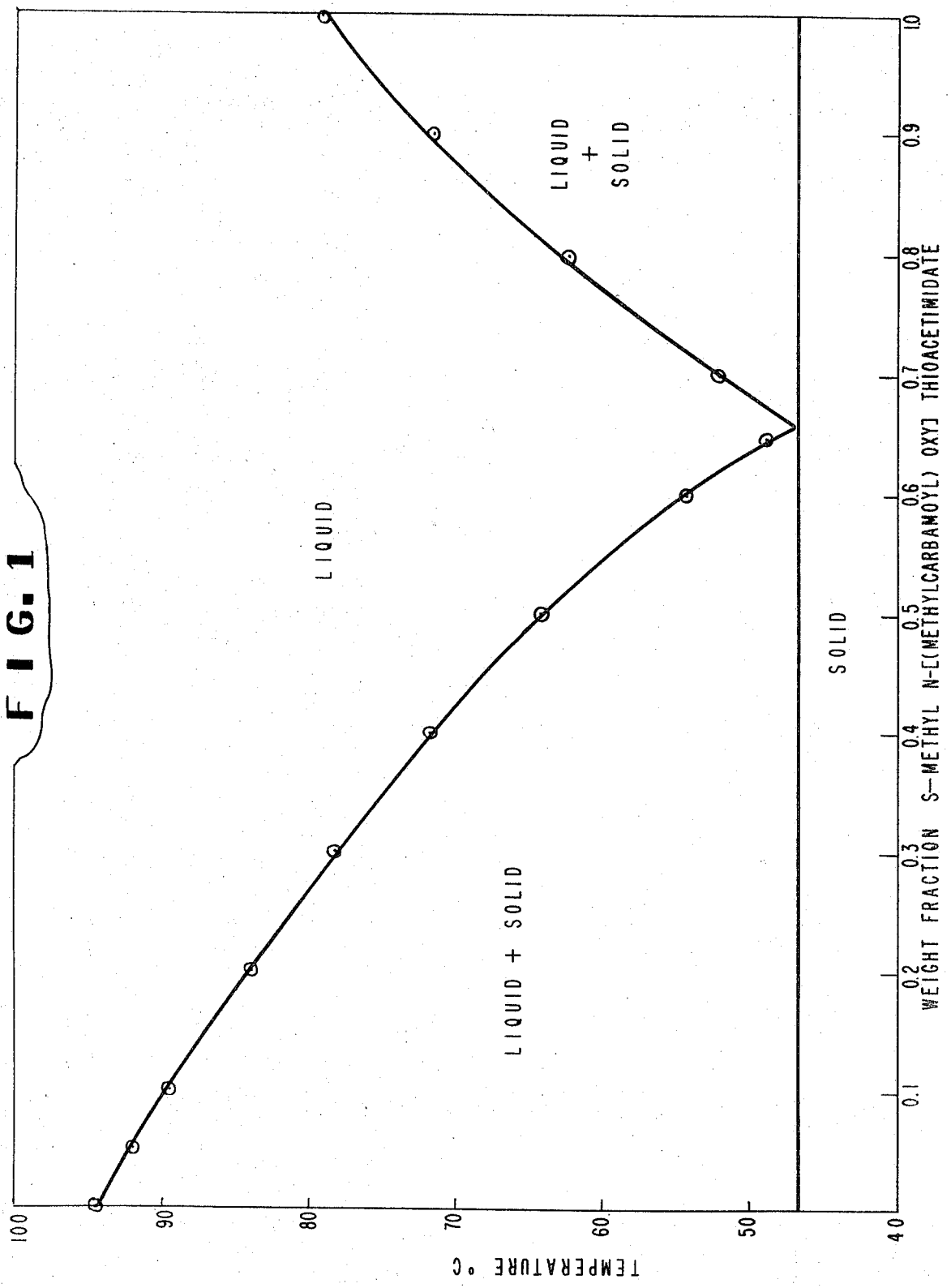
FIG. 1 is the solid-liquid phase diagram for binary mixtures of purified S-methyl N-hydroxythioacetimidate and purified S-methyl N-[(methylcarbamoyl)oxy]thioacetimidate.

This invention is an improvement in the process of making S-methyl N-[(methylcarbamoyl)oxy]thioacetimidate

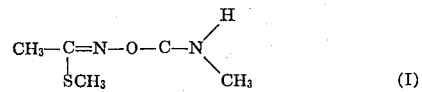

(I)

by reacting methylisocyanate with S-methyl N-hydroxythioacetimidate in the absence of solvent.

The improvement comprises carrying out the reaction between the methylisocyanate and the S-methyl N-hydroxythioacetimidate under conditions such that the reaction mass is maintained as a continuous liquid phase for at least a terminal portion of the reaction. A continuous liquid phase includes a liquid with solids suspended therein as well as a liquid without such suspended solids. What is necessary to maintain a continuous liquid phase is that there not be such a high proportion of solids that the liquid phase becomes interrupted, i.e., not continuous. With respect to mixtures of the precursor and product thioacetimidates of the present invention, a continuous liquid phase has been found to exist in such mixtures containing as much as 75% (by weight) solids.

The above-mentioned reaction is exothermic and care must be taken to prevent excessive temperatures which may result in side reactions and the production of undesirable by-products or decomposition of the reactants or reaction products. Accordingly, it is generally desirable to run the reaction at as low a temperature as possible while maintaining the reaction mass as a continuous liquid phase for at least a terminal portion of the reaction. The lowest temperature at which the reaction mass will be a continuous liquid phase will vary depending upon the quantity of precursor thioacetimidate present in the reaction mass, the quantity of product thioacetimidate present in the reaction mass, the quantity of unreacted or excess methylisocyanate present in the reaction mass and the quantity of impurities present in the reaction mass. In addition, since the reaction is sufficiently fast, high temperatures can be tolerated for short periods of time before the degree of side reaction or the degree of product and reactant decomposition becomes significant. Nevertheless, as a practical matter, the rates of isocyanate addition and heat removal are balanced so as to maintain the temperature of the reaction mass between about 35° and 120°C.

This improved process produces S-methyl N-[(methylcarbamoyl)oxy]thioacetimidate more rapidly and in higher yields than the solid state process disclosed by Alvarez, and without the investment required to conduct solvent reactions.

DETAILED DESCRIPTION OF THE INVENTION

The improved process of this invention can be carried out either batchwise or continuously under conditions such that, for at least a terminal portion of the reaction, the reaction mass is maintained as a continuous liquid phase. Accordingly, at the completion of the reaction the temperature of the reaction mass will be between about 70° and 120°C. It is preferred to operate so that the final reaction mass temperature is between about 70° and 100°C. and an optimum yield and quality may be achieved by operating so that the final reaction mass is between about 75° to 85°C.

Higher temperatures will increase the amounts of side reactions and production of undesirable by-products and will also increase the decomposition of the reaction product as well as decomposition of the precursor reactant. Lower temperatures will result in incomplete reaction or in the reaction mass becoming tacky and therefore difficult to handle.

As mentioned above, the reaction mass should be maintained as a continuous liquid phase for at least a terminal portion of the reaction. It is preferred that such continuous liquid phase be maintained for at least the terminal 5% of the reaction, i.e., for at least that portion of the reaction where 5% (by weight) of the reactants remain unreacted. It is more preferred that such continuous liquid phase be maintained for at least the terminal 25% of the reaction. And it is most preferred that the temperature of the reaction mass be permitted to rise autogeneously at the beginning of the reaction until the reaction mass becomes a continuous liquid phase, and that such continuous liquid phase be maintained for the remainder of the reaction. Performing the reaction thus, permits a very rapid and complete reaction while keeping side reactions and decomposition to a minimum.

The advantages of producing S-methyl N[(methylcarbamoyl)oxy]thioacetimidate by the process of the present invention rather than by the solid state process disclosed by Alvarez include higher yields of the finished product being able to use lighter, less expensive equipment. It will be apparent that as more of the reaction is run while maintaining the reaction mass as a continuous liquid phase, the latter advantage becomes even more significant.

By reference to the graph shown in FIG. 1, it can be seen that where both the precursor and the product thioacetimidate are purified, the eutectic melting point is approximately 47°C and the eutectic composition is approximately 67% (by weight) of S-methyl N-[(methylcarbamoyl)oxy]thioacetimidate. Thus, in the preferred embodiments, the reaction mass should be maintained at a temperature sufficiently above the eutectic melting point to maintain the reaction mass as a continuous liquid phase. The temperature necessary to accomplish this will vary as indicated by the phase diagram as the reaction progresses from left to right in the graph. The presence of impurities will lower the eutectic melting point, and adjustments in operating conditions accordingly.

The process can be carried out at reduced or elevated pressures but atmospheric pressure is preferred for economic reasons.

The preferred molar ratio of the reactants is 0.95 to 1.05. More than the stoichiometric amount of isocyanate can be used but this results in increased impurities and a waste of the isocyanate.

In performing the reaction batchwise, two basic embodiments are possible. First, the methylisocyanate can be added over a period of time to the precursor thioacetimidate. The reaction proceeds extremely rapidly, and for all practical purposes the quantity of isocyanate in the reaction mass will be minor, and the reaction mass will consist essentially of precursor thioacetimidate and product thioacetimidate. The solid-liquid phase diagram for such a binary mixture (assuming purified S-methyl N-hydroxythioacetimidate and purified S-methyl N-[(methylcarbamoyl)oxy]-thioacetimidate) is shown in FIG. 1.

Figure 2:
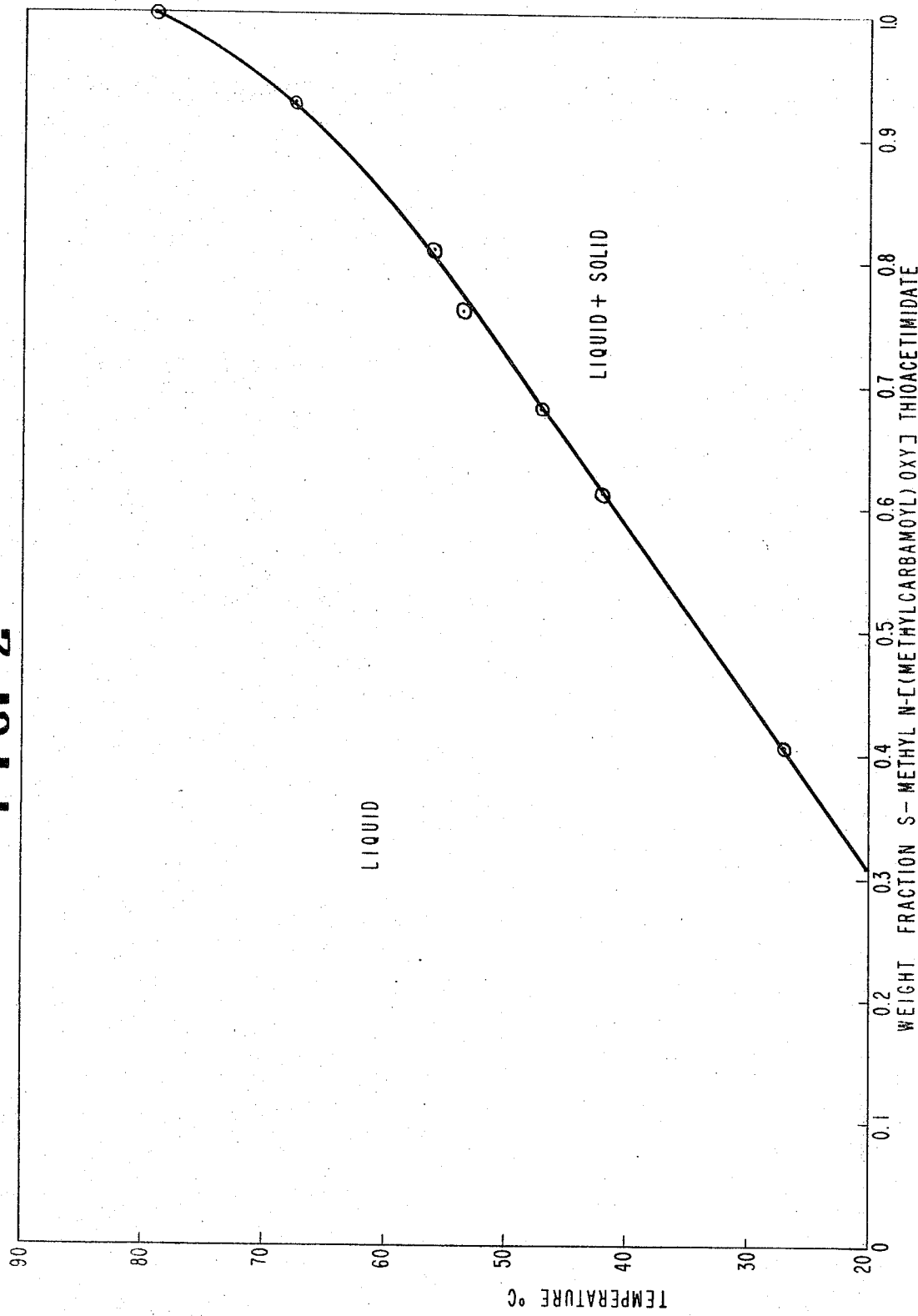
FIG. 2 is a partial solid-liquid phase diagram for binary mixtures of methylisocyanate and S-methyl N-[(methylcarbamoyl)oxy]thioacetimidate.

Second, the precursor thioacetimidate can be added over a period of time to the methylisocyanate. Similarly, the reaction proceeds extremely rapidly, and for all practical purposes the quantity of precursor thioacetimidate in the reaction mass is minor, and the reaction mass will consist essentially of methylisocyanate and product thioacetimidate. A partial solid-liquid phase diagram for such a binary mixture (assuming purified precursor and product thioacetimidates) is shown in FIG. 2.

In both of these embodiments the reactants can initially be at room temperature or they can be preheated. In preheating the reactants, care must be taken to prevent temperatures so high that significant decomposition will occur before the reaction commences or during the early stages of the reaction. It must be remembered that the reaction is exothermic and preheating the reactants is optional. As mentioned above, a suitable alternative is to permit the temperature of the reaction mass to rise autogeneously until a continuous liquid phase occurs and/or until the desired final temperature is achieved. Thus the methylisocyanate can initially be either liquid or gaseous. The S-methyl N-hydroxythioacetimidate will initially be solid.

If desired, a heel of finished S-methyl N-[(methylcarbamoyl)oxy]thioacetimidate from previous production can be mixed with the precursor thioacetimidate. Any amount of heel can be used but as a practical matter, this will not exceed about 95% by weight of the total amount of said thioacetimidates at the start of the reactant addition. As can be seen from the phase diagram shown in FIG. 1, depending upon the amount of heel added to the S-methyl N-hydroxythioacetimidate, this mixture can be preheated sufficiently to create a continuous liquid phase at temperatures as low as approximately 47°C.; and a continuous liquid phase will occur at even lower temperatures in the presence of impurities. Thus under certain conditions it might be desirable to run the reaction with the reaction mass maintained as a continuous liquid phase for the entire period of the reaction.

In addition, inert solid diluents and/or anti-caking agents can be mixed with the precursor thioacetimidate. The amount of diluent will likewise ordinarily not exceed 95% by weight of the total weight of said thioacetimidates. And the amount of anti-caking agent will generally not exceed about 1–2% by weight of the reaction mass. Where more than one of these three materials are used, their combined amount should not exceed 95% by weight of the reaction mass, in order to avoid undue dilution of the reactants.

Inert diluents which can be used are those which are ordinarily used in solid, particulate agricultural formulations so that the product can be used in agriculture without further substantial processing. Examples of inerts which can be used are ammonium sulfate, sodium sulfate, urea, potassium chloride, synthetic precipitated hydrated silicon dioxide, diatomaceous earths, and clays such as those listed in Weidhaus and Brann, *Handbook of Insecticide Dust Diluents and Carriers*, Dorland Books (1955). Some of these have a plant physiological effect, but they are considered inert for purpose of this invention in that they do not enter into the reaction. The concentration of inert diluent in the reaction mass should not exceed the concentration desired in the final product. If desired, inerts can be added after the reaction is complete. Dispersants and anti-caking agents can also be included in the reaction mass. Suitable dispersants are listed in McCutcheon, *Detergents and Emulsifiers Annual*, 1970. Colloidal silica is a particularly suitable anti-caking agent.

Addition of the reactants may occur over a period of time from five minutes to as much as two hours. The length of time will depend primarily on the rate of removal of heat produced by the reaction and the degree of agitation and intermixing of the reactants. It is preferred that addition of the reactants is accomplished within a period of about thirty minutes followed by a period of at least 5 minutes to allow the reaction to go to completion.

After the reaction mass becomes a continuous liquid phase, either by preheating the reactants, by permitting the temperature of the reaction mass to rise autogeneously, or by a combination of these, the rates of heat removal and reactant addition are balanced so as to maintain the reaction mass at the desired temperature, i.e., the temperature of the reaction mass should be high enough to prevent tackiness but low enough to avoid side reactions and decomposition. A final temperature of about 75° to 85°C. will result in optimum yield of the highest quality product.

Use of a catalyst is optional. Suitable catalysts include triethylamine, triethylenediamine, other such tertiary amines, and alkali metal hydroxides, such as sodium and potassium hydroxide. A preferred amount of catalyst is about 0.001 to 0.01 mole of catalyst per mole of S-methyl N-hydroxythioacetimidate.

The reaction can be conducted in any vessel that will provide uniform mixing of reagents. Examples of such vessels include an agitated kettle or autoclave, a ribbon blender or a sigma arm mixer. Because the reaction mass is maintained mostly or all in a liquid condition, the mixing equipment can be lighter than that required for a solid phase reaction and power requirements will also be substantially less.

One of the most surprising and most attractive features of the present invention, which is also one of the major advantages of the present invention, is that the molten, liquid phase reaction product may be allowed to cool to below 79°C. directly in the mixing apparatus, e.g., in the sigma arm mixer, to give a free-flowing, crystalline powder possessing good handling properties without the formation of any highly viscous, sticky masses which would normally be expected in the direct cooling of a molten organic reaction product. This eliminates the necessity for a separate cooling apparatus, and thereby reduces both the initial investment required as well as operating expenses. Of course, if desired, the reaction mass can be removed from the reaction vessel in the liquid state and solidified into a usable form by conventional procedures, for example, flaking or spraying into a cool agitated bed of solid particles.

Cooling of the reaction product may also be accomplished by addition of the molten product directly to a methanol/water mixture thus producing a liquid formulation, which is the subject matter of copending U.S. patent application Ser. No. 317,802, filed simultaneously herewith, by Johnny Leroy Armstrong. Thus, the reaction product may be cooled at the same time that it is being dissolved in the above-mentioned solvent thus eliminating separate cooling and dissolution steps. This liquid formulation is especially useful and easy to use as is discussed in detail in the above-mentioned copending U.S. patent application.

The S-methyl N-[(methylcarbamoyl)oxy]thioacetimidate can be added to the methanol/water mixture in an amount sufficient to make the final concentration of thioacetimidate from about 10% by weight to about 30% by weight thioacetimidate. The methanol/water mixture can contain from about 20% to about 95% methanol.

EXAMPLE 1

105.2 grams of technical S-methyl N-hydroxythioacetimidate are charged to a 500 milliliter round bottom flask fitted with an addition funnel, thermometer, reflux condenser and agitator. The solids are heated to 45°C. with mixing and 1.1 milliliters of triethylamine are added. This is followed by the uniform addition of 57.1 grams of methyl isocyanate over a period of approximately 15 minutes during which the temperature rises autogeneously to 84°C., and is maintained at 80° to 85°C. with a cold water bath. 158.7 grams of technical S-methyl N-[(methylcarbamoyl)oxy]thioacetimidate was recovered, 98.1% pure.

EXAMPLE 2

585.0 grams of technical S-methyl N-hydroxythioacetimidate and 300.0 grams of technical S-methyl N-[(methylcarbamoyl)oxy]thioacetimidate (98.2% pure) are charged to a 5.0 liter sigma arm mixer fitted with a reflux condenser, addition funnel, and temperature readout. The bed was mixed for 10 minutes, heated to 40°C., and 6.0 milliliters of triethylamine were added. This was followed by the uniform addition of 327.5 grams of methyl isocyanate over 10 minutes during which time the temperature rose to and was maintained at 80° to 85°C. by circulating 60° water through the mixer jacket. Following the addition, the mass was held at this temperature for 10 minutes. 1,183.0 grams of technical S-methyl N-[(methylcarbamoyl)oxy]thioacetimidate was recovered, 97.8% pure.

EXAMPLE 3

57.1 grams of methylisocyanate are charged to a 250 milliliter round bottom flask fitted with a thermometer, reflux condenser, agitator, and solids feeder. 105.2 grams of solid S-methyl N-hydroxythioacetimidate was fed to the isocyanate over a period of 15 minutes during which time the temperature rose autogenously from 23°C. to 85°C. The temperature was maintained at approximately 80° to 85°C. with an ice bath. 159.4 grams of S-methyl N-[(methylcarbamoyl)oxy]thioacetimidate was recovered, 97.4% pure.

EXAMPLE 4

The molten S-methyl N-[(methylcarbamoyl)oxy]thioacetimidate prepared by the procedure in Example 2 is cooled to approximately 75°C., and maintained at this temperature for about 15 minutes to allow crystals to form. Following this hold period, the solids are further cooled to about 35° to 40°C., and 1.0% of anti-caking agent is added and mixed with the product for 2 to 3 minutes. The resulting S-methyl N-[(methylcarbamoyl)oxy]-thioacetimidate product is granular and free-flowing.

EXAMPLE 5

The molten S-methyl N-[(methylcarbamoyl)oxy]-thioacetimidate produced as in Example 2 is discharged as a liquid into a mixture of methanol and water at a rate such that the temperature of the resulting solution does not exceed 50°C. The resulting solution is convenient and easy to use.

I claim:

1. In the method of making S-methyl N-[(methylcarbamoyl)oxy]thioacetimidate by reacting methylisocyanate with S-methyl N-hydroxythioacetimidate in the absence of solvent, the improvement which comprises contacting the reactants under conditions such that for at least a terminal portion of the reaction the reaction mass is maintained as a continuous liquid phase.

2. Method of claim 1 wherein the reaction mass is maintained as a continuous liquid phase for at least the terminal 5 percent of the reaction.

3. Method of claim 1 wherein the reaction mass is maintained as a continuous liquid phase for at least the terminal 25 percent of the reaction.

4. Method of claim 1 wherein the rates of reactant addition and heat removal are balanced such that at the completion of the reaction the temperature of the reaction mass is between about 75° and 85°C.

5. Method of claim 1 wherein the methylisocyanate is contacted with solid S-methyl N-hydroxythioacetimidate, and further wherein the temperature of the reaction mass is permitted to rise autogeneously at the beginning of the reaction until said reaction mass becomes a continuous liquid phase, and the reaction mass is maintained as a continuous liquid phase for the remainder of the reaction.

6. Method of claim 1 wherein diluent or S-methyl N-[(methylcarbamoyl)oxy]thioacetimidate heel is mixed with at least one of the reactants before or during the reaction.

7. Method of claim 1 wherein the molar ratio of isocyanate to thioacetimidate is 0.95 to 1.05.

8. Process of claim 1 wherein a catalytic amount of a tertiary amine or alkali metal hydroxide is present in the reaction mass.

* * * * *